Patented June 17, 1941

2,245,867

UNITED STATES PATENT OFFICE 2,245,867

TREATMENT OF PLANTS

Ferdinand P. Mehrlich, Honolulu, Territory of Hawaii, assignor to Hawaiian Pineapple Company, Limited, Honolulu, Territory of Hawaii, a corporation of Hawaii No Drawing. Application November 9, 1936, Serial No. 110,018

6 Claims. (Cl. 47—58)

The present invention relates to the treatment of plants to expedite the formation or development of buds thereon, and to a material for use in such treatment.

It is an object of the invention to provide an improved method of and material for treating plants to expedite or force the formation or development of buds and consequently the production of fruit thereon. Other objects of the invention will become apparent as the description proceeds.

While applicable to a wide variety of plants, for illustrative purposes the invention will be described in connection with the treatment of pineapple plants. In the case of pineapple plants, the harvest of the fruit is largely concentrated in the period between June 15th and September 15th, during which time approximately 75% of the annual tonnage is delivered to the canneries. My invention provides an efficient and practicable method of and material for reducing this peak in the harvest and spreading the same over a longer period of time. My treatment is also effective in forcing an extra crop out of ratoons and in expediting flowering or bud development on "carry-over" plants.

The invention comprises treatment of plants with a material comprising water or other suitable carrying medium, a colloidal clay-like substance such as bentonite and an unsaturated hydrocarbon such as acetylene and/or ethylene.

As a specific example of one material suitable for treatment of pineapple and other plants in accordance with my invention, the following may be given, it being understood that this is by way of example only and not in a limiting sense. Bentonite is thoroughly suspended in water, in the proportions of approximately one pound of bentonite to two and one-half gallons of water. An electrical mixer of standard type may conveniently be used to form this suspension or dispersion. The resulting mixture of bentonite and water is then saturated with an unsaturated hydrocarbon such as acetylene or ethylene. This may conveniently be done by placing the bentonite-water mixture in a drum and introducing the gas under pressure, the advantage of pressure being that a shorter period of time is required to saturate the mixture with the gas. Although preferred, it is not necessary that the mixture be saturated with the gas, as introduction of gas in lesser quantities than required for saturation will still be effective.

Although unsaturated hydrocarbons such as acetylene and ethylene, selected from the acetylene or olefine series of hydrocarbons, may be used either alone or in combination, ethylene is a preferred hydrocarbon for use in my material.

It is advantageous to include in the material small quantities of magnesium oxide, sulphuric or other acid, or like materials which increase the tendency of the bentonite, colloidal clay or other like substance to form a gel.

The material, which may, for example, be prepared as above indicated, is advantageously applied to the plants by spraying, as from standard spray equipment. It is advantageous to apply the spray in such a way that the liquid will run into the leaf bases near the top to the middle of the plant. The spraying pressures may be varied, as also the particle size of the spray and the distance of the spray nozzle from the plants.

The unsaturated hydrocarbon such as acetylene or ethylene may be introduced into the mixture of water and bentonite or other colloidal clay-like material while the said mixture is being pumped through a pipe line to the spray nozzle, or in any other convenient manner.

Considerable variation in the amount of bentonite used in the spray mixture is permissible, a mixture carrying 2% bentonite having been used successfully, although higher percentages are generally preferable. A 5% suspension has been found very efficient.

Treatment of pineapple and other plants with the material above described has been found highly effective and advantageous, as compared for example with treatment with a solution of an unsaturated hydrocarbon in water. The bentonite suspension absorbs more than twice as much ethylene, for example, as does water alone, and after spraying, a much greater quantity of ethylene will be found in the mixture than in a solution of ethylene in water. Although I am not certain, I believe that the bentonite or like material itself absorbs the unsaturated hydrocarbon and carries it to the plant and that it is the hydrocarbon which is carried by the bentonite which produces the desired result, any hydrocarbon held in the water being without material significance in accomplishing the desired end. In any event, treatment with my material has been found highly effective where spraying with an aqueous solution of acetylene produced no effect in expediting flowering.

As stated above, my invention has proven highly effective when used, for example, in avoiding peaks in fruit production, in hastening flowering and fruit production on carry-over plants and in forcing an extra crop out of ratoons. It has further been found highly effective in the production of shoots and slips on pineapple plants, which is an important feature since these plant parts are the means by which the pineapple plant is propagated.

I claim:

1. The treatment of pineapple and other plants to expedite the formation of buds and the development of fruit thereon which comprises spraying the plants with a material comprising a liquid carrying medium containing bentonite and an unsaturated hydrocarbon selected from the group consisting of acetylene and ethylene.

2. The treatment of pineapple plants to expedite the development of buds and the formation of fruit thereon which comprises spraying said plants with a liquid material comprising water, finely-divided bentonite and ethylene.

3. The treatment of pineapple plants to expedite the development of buds and the formation of fruit thereon which comprises spraying said plants with a liquid material comprising water, finely-divided bentonite and acetylene.

4. The treatment of plants for accelerating the formation of buds thereon, which comprises spraying the plants with a material comprising a colloidal clay-like substance and an unsaturated hydrocarbon selected from the group consisting of acetylene and ethylene.

5. A method of supplying a gaseous stimulant to bud formation or development to plants, which comprises absorbing said stimulant in a mixture of a colloidal clay-like substance and a liquid and spraying the resulting material on the plants.

6. The treatment of plants for accelerating the formation of buds thereon, which comprises spraying the plants with a material comprising a gaseous stimulant to bud formation and a colloidal clay-like substance.

FERDINAND P. MEHRLICH.